(12) United States Patent
Caluori

(10) Patent No.: US 7,836,806 B2
(45) Date of Patent: Nov. 23, 2010

(54) POSITIVE-ANGLED LIGHT BEAM ROTARY SAW CUT ALIGNMENT DEVICE

(76) Inventor: Raymond J. Caluori, 5 Briggs St., Quincy, MA (US) 02170

( * ) Notice: Subject to any disclaimer, the term of this patent is extended or adjusted under 35 U.S.C. 154(b) by 669 days.

(21) Appl. No.: 11/070,913

(22) Filed: Mar. 3, 2005

(65) Prior Publication Data

US 2005/0166737 A1 Aug. 4, 2005

Related U.S. Application Data

(63) Continuation-in-part of application No. 10/207,502, filed on Jul. 29, 2002, now Pat. No. 6,915,727, and a continuation-in-part of application No. 10/878,988, filed on Jun. 28, 2004.

(51) Int. Cl.
*B26D 7/00* (2006.01)
(52) U.S. Cl. ............... 83/521; 83/477.1; 83/522.17; 30/388
(58) Field of Classification Search ........... 83/520–521, 83/490, 676, 633, 469, 522.11, 522.18, 522.19, 83/522.26, 522.21, 477.1, 471.2, 471.3, 522.15, 83/522.17, 478; 451/6; 408/16; 362/89, 362/259, 287, 84, 285, 553; 30/390–392, 30/388, 123
See application file for complete search history.

(56) References Cited

U.S. PATENT DOCUMENTS

| 5,375,495 | A | * | 12/1994 | Bosten et al. | 83/520 |
|---|---|---|---|---|---|
| 5,446,635 | A | * | 8/1995 | Jehn | 362/259 |
| 6,035,757 | A | * | 3/2000 | Caluori et al. | 83/520 |
| 6,584,695 | B1 | * | 7/2003 | Chang | 30/391 |
| 6,742,430 | B2 | * | 6/2004 | Chen | 83/520 |
| 6,755,107 | B2 | * | 6/2004 | Peot et al. | 83/478 |
| 2005/0000342 | A1 | * | 1/2005 | Ushiwata et al. | 83/520 |

* cited by examiner

*Primary Examiner*—Phong H Nguyen
(74) *Attorney, Agent, or Firm*—Brian M. Dingman; Mirick, O'Connell, DeMallie & Lougee

(57) ABSTRACT

A cut alignment device for a rotary saw having a motor which spins a cutting unit which includes a rotary shaft driven by the motor, a circular blade having a central aperture through which the shaft fits, and a structural housing. The cut alignment device includes the structural housing defining two or more internal compartments, a battery power source carried within the structural housing, and a beam light source, operatively connected to this power source, and also located within the structural housing. The light source projects a light beam from the cutting unit directed slightly away from the plane of the rotary cutting tool or saw blade such that it never intersects the plane of the blade, to assist the operator in cutting accurately.

10 Claims, 8 Drawing Sheets

POSITIVE-ANGLED LIGHT BEAM ROTARY SAW CUT ALIGNMENT DEVICE

CROSS REFERENCE TO RELATED APPLICATION

This application is a continuation-in-part of application Ser. No. 10/207,502 filed on Jul. 29, 2002, now U.S. Pat. No. 6,915,727 and a continuation-in-part of application Ser. No. 10/878,988 filed on Jun. 28, 2004. Priority of both applications is claimed.

FIELD OF THE INVENTION

This invention relates to a saw-mounted cut alignment device for a rotary saw which projects a line of light along the stock being cut to assist the operator in making a cut.

BACKGROUND OF THE INVENTION

Rotary saws such as circular saws, chop saws, radial arm saws, miter saws and table saws require that the operator properly align the material being cut with the saw blade. This takes time and care, but is critical for a proper cut.

There exist laser-based cut alignment devices which are externally mounted in the vicinity of the saw, and project a light beam along the cut line. These devices must be manually aligned before cutting begins, thus requiring experience and additional time. Also, the operator must monitor this additional piece of equipment in order to use the alignment device properly. Accordingly, devices of this nature are not practical for most saw owners and operators.

SUMMARY OF THE INVENTION

It is therefore an object of this invention to provide a cut alignment device for a rotary saw.

It is a further object of this invention to provide such a cut alignment device which is mounted to the saw.

It is a further object of this invention to provide such a cut alignment device which is automatically self-aligning.

It is a further object of this invention to provide such a cut alignment device that requires no operator set-up.

It is a further object of this invention to provide such a cut alignment device that illuminates a line on the material to be cut.

It is a further object of this invention to provide such a cut alignment device that turns on only when the saw is activated.

It is a further object of this invention to provide such a cut alignment device that decreases the amount of time required for a saw operator to align the material with the cutting edge of the saw blade.

It is a further object of this invention to provide such a cut alignment device that increases the safety of operating the saw.

This invention results from the realization that rotary saws can be made more accurate and easier to use with a light-source mounted on the rotating portion of the saw which projects a beam of light on the material to be cut.

This invention features a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising a housing, a battery power source located within the housing, and a beam light source, operatively connected to the power source, and located within the housing. The light source projects a light beam from the cutting unit directed slightly away from the plane of the blade at a positive angle such that the beam is not parallel to, and is projected on a path that never intersects the plane of the blade, to assist the operator in cutting accurately.

The cut alignment device may further include a switch between the power source and the light source for selectively applying power to the light source. The switch may be centrifugally engaged to automatically power the light source when the shaft is spinning. The light source may be mounted within the blade mounting device or housing, and the blade mounting device may define an aperture from which the light beam emanates. The device may further include a focusing lens aligned with the aperture for focusing the light from the light source. The blade-mounting device may include the structural housing held on the shaft against the blade, and wherein the light source is mounted within the structural housing.

Also featured is a cut alignment device for a rotary saw having a motor which spins a cutting unit which includes a rotary shaft driven by the motor, a circular blade having a central aperture through which the shaft fits, and a blade mounting device for holding the blade on the shaft, the cut alignment device comprising a battery power source mounted within a housing which comprises the blade mounting device, a light source operatively connected to the power source and mounted within the housing, wherein the housing defines an aperture from which the light emanates, and a centrifugally-engaged switch between the power source and the light source and mounted within the housing to automatically power the light source when the shaft is spinning, wherein the light source projects a light beam from the aperture directed slightly away from the plane of the blade at a positive angle such that the beam is not parallel to the plane of the blade and never intersects the plane of the blade, to assist the operator in cutting accurately.

This invention relates to a light-emitting rotary saw cut alignment device of the type disclosed in U.S. Pat. No. 6,035,757 (incorporated herein by reference). The inventive assembly accomplishes a light source that is focused and adjusted to the desired angle relative to the cutting blade, and then fixed in place so that the resulting light beam falls where desired relative to the cut line.

A key to the successful operation of a light-emitting rotary saw cut alignment device is to have the light beam focused at the proper location relative to the saw and at the proper distance from the device, such that it forms a sharp beam or line at the correct location on the material being cut. This objective can be accomplished with the constructions shown in the drawings, which provide for sufficient structural strength and integrity to allow the device to withstand the rigors (the compressive force and the centrifugal force) of use.

In this invention, the light is emitted from a device that is held on the blade arbor, against the blade. In order to be useful with chop saws and miter saws and all types of rotary saws, it is desirable to have the light beam leave the device housing very close to the surface of the blade (typically within about 0.25 inches from the blade surface), preferably from between 0.0001 and 0.160 inches from the blade surface. This distance is dictated in part by the thickness of the wall of the device housing that rests against the blade, and in part by the construction and layout of the diode and lens assembly, as more fully described below. Preferably, this construction is such that the beam leaves the housing at a shallow positive angle that is sufficient to cause the beam to diverge slightly away from the plane of the cutting blade such that the beam is not parallel to the plane of the blade and never intersects the plane of the blade. This allows the line illuminated by the beam to fall where desired relative to a pencil line drawn on the stock, thus assisting the operator in properly aligning the blade. The device can be adapted to be turned on or off manually as well as automatically.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

Figure 1A:
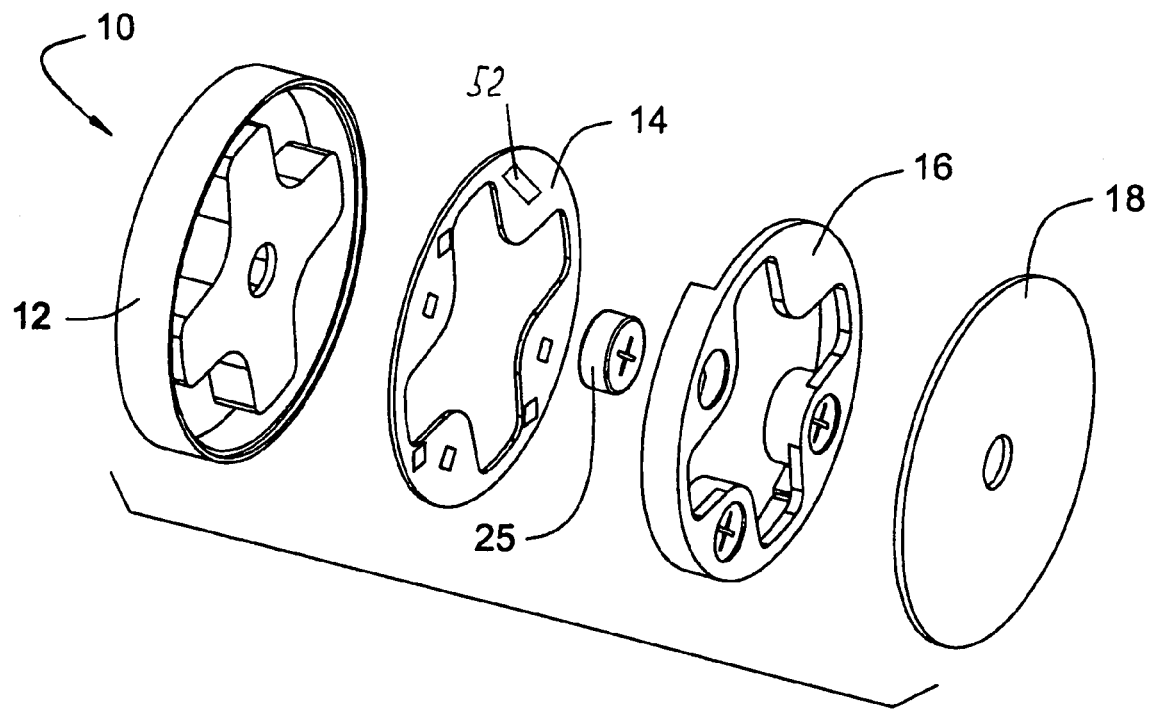
FIGS. 1A and 1B are exploded views of one embodiment of the cut alignment device of this invention.
Figure 1B:
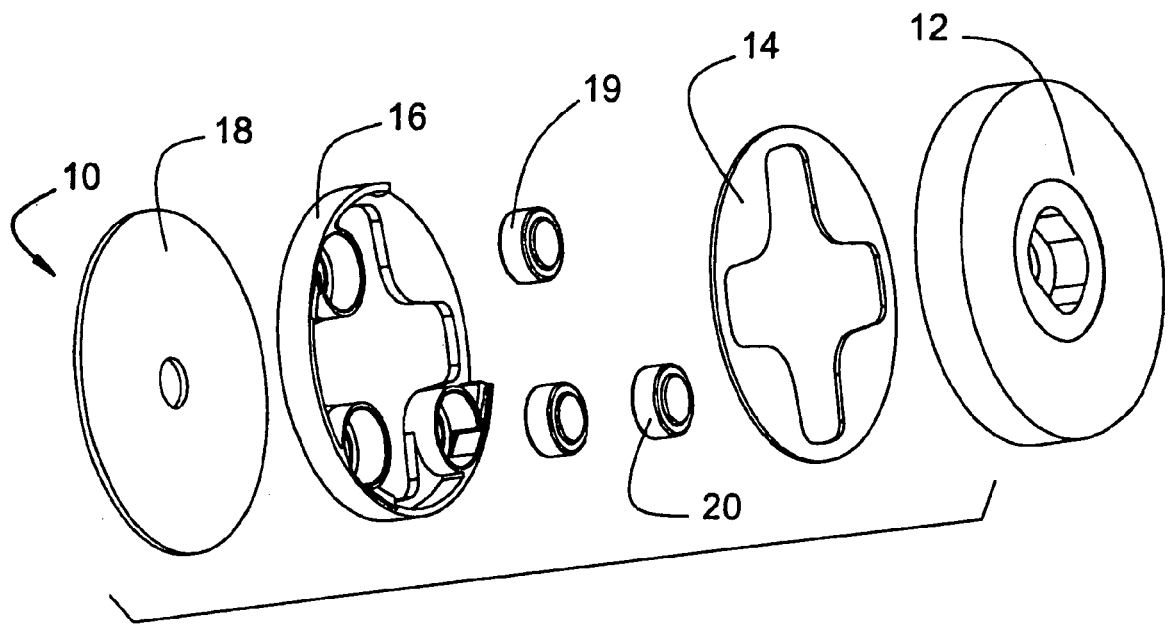

The disclosures of the parent applications, Ser. No. 10/207, 502 filed on Jul. 29, 2002, and Ser. No. 10/878,988 filed on Jun. 28, 2004, are incorporated herein by reference.

One embodiment of the inventive device is shown in FIGS. 1-6. Device 10 includes stainless steel housing 12 that provides the structural integrity for the device. The raised central cross-shaped portion 13 with four arms protects the electronic components that are located in the pockets 21-24 created thereby (not shown fully in the drawings) so that they are not crushed when the device is placed on an arbor and the nut is tightened down; it also maintains the integrity of the housing so that it doesn't bend and change the alignment of the laser beam. Also, this construction helps to maintain the device to be sufficiently mass-balanced around the center of the device, so that it is relatively rotationally balanced. Battery holder 16 is a plastic molded part that has three cavities to hold three button cells 19, 20 and 25 in a manner such that their tops and bottoms are exposed, so that electrical contact can be made. The holder has a central cross-shaped opening that allows it to fit over the central portion of the housing. Washer 18 is the cover for the assembly. Part 14, not shown in detail in the drawings, is a circuit board that provides the electrical connections between the batteries and from the centrifugally-operated switch 52 to the laser diode. The result is a device that emits light only when the arbor to which it is attached is rotating.

Figure 1C:
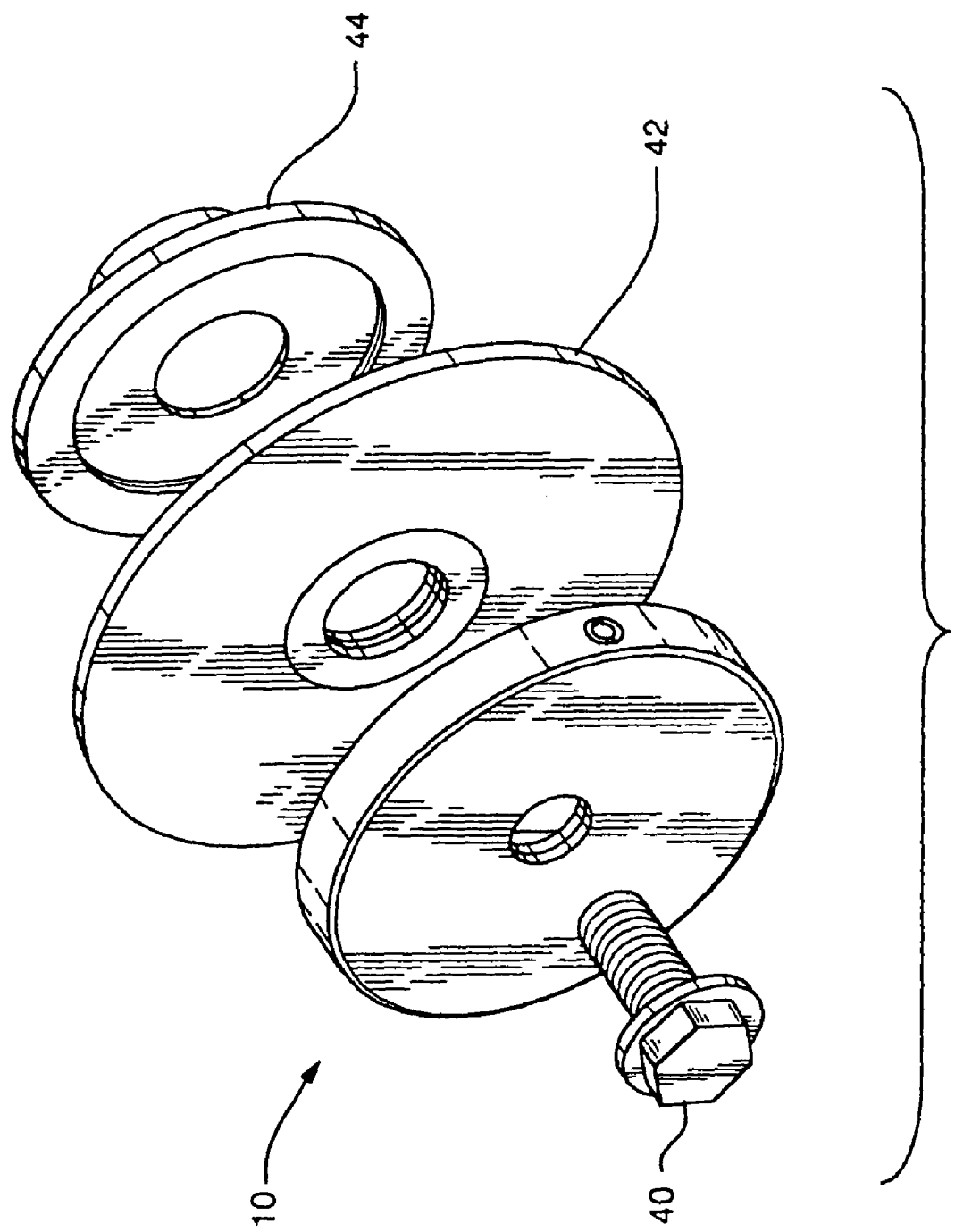
FIG. 1C is an exploded view of the device of FIGS. 1A and 1B and the preferred mounting hardware to mount the device to a saw arbor.
Figure 2:
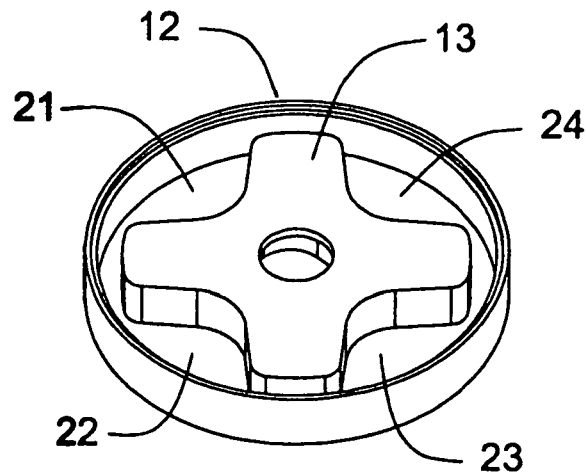
FIG. 2 is a view of the housing of FIG. 1.
Figure 3:
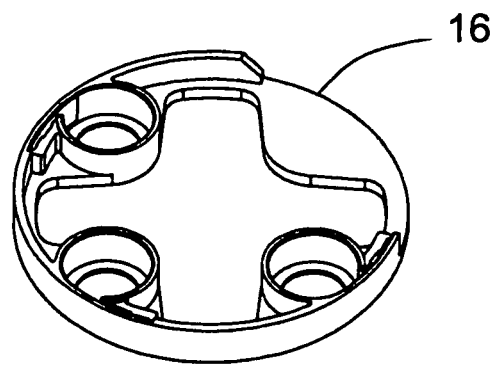
FIG. 3 is a view of the battery holder of FIG. 1.

FIG. 1C shows the preferred manner in which device 10 is mounted to the arbor of a rotary saw. Bolt 40 passes through device 10, saw blade 42, and flange 44 into the motor shaft, not shown in this drawing. Device 10 replaces the washer of a typical rotary saw blade mounting assembly. Device 10 preferably has a thickness between 0.125" and 1.0", so that the device does not interfere with the safety guard shield and/or the safety guard shield operating mechanism of the saw.

Figure 4:
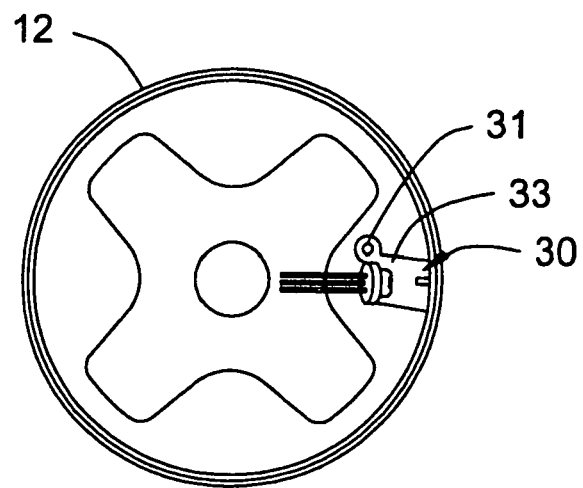
FIG. 4 is a greatly enlarged top view of a partially assembled device of FIG. 1.
Figure 5:
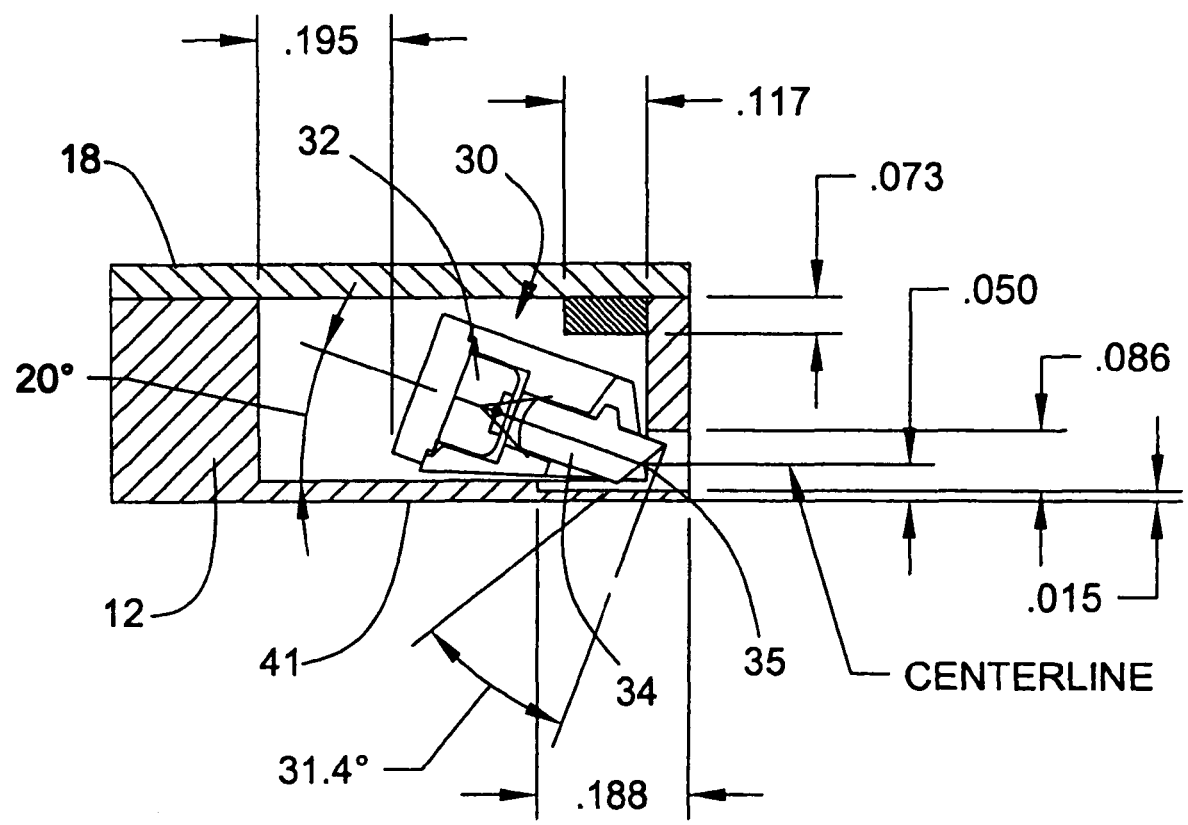
FIG. 5 is a partial cross-sectional view of the assembled device of FIG. 1.
Figure 6:
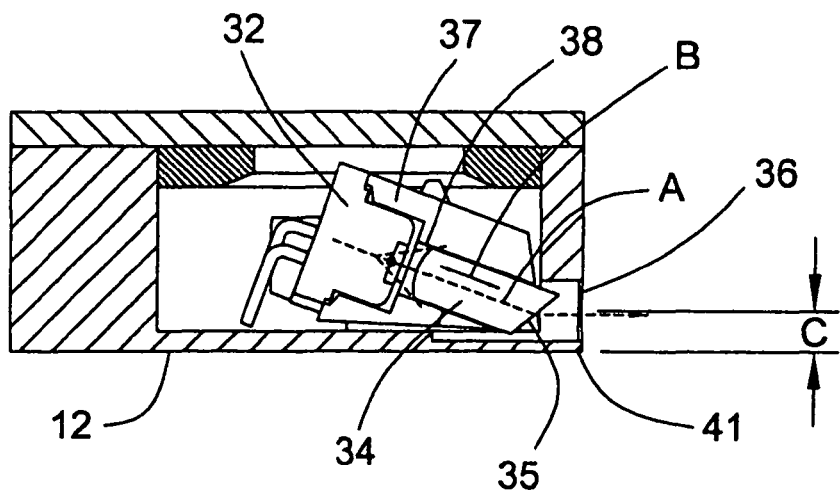
FIG. 6 is a partial cross-sectional greatly enlarged view of a portion of the assembly of FIG. 5.
Figure 10:
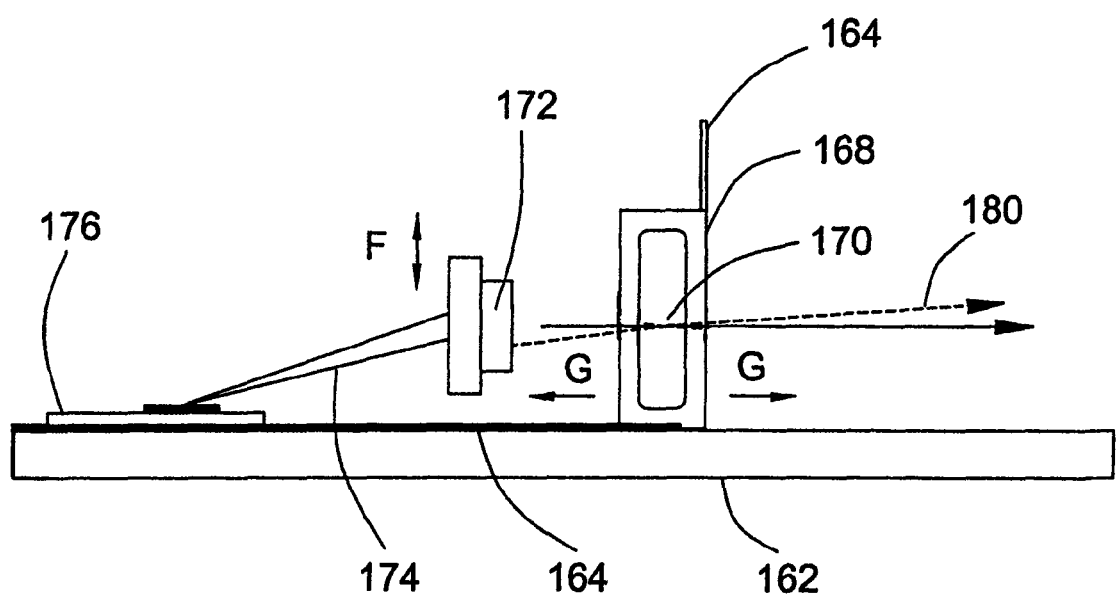
FIG. 10 is a partial cross-sectional side view of the preferred embodiment of the laser diode light delivery location and focusing means of the invention.

Optical assembly 30 is shown in FIGS. 4-6. Laser diode 32 is held in housing 37. Lens 34 is slideable in the direction of arrow B within cylindrical bore 38 of housing 37. Lens 34 has an angled light emitting distal end 35 that refracts the light beam along axis A, so that the beam is emitted almost, but not quite, parallel to the bottom surface 41 of housing 12, at a positive angle such that the beam is not parallel to the plane of the blade and never intersects the plane of the blade. In the invention, the beam is angled slightly away from the plane of the saw blade (or other machine tool), so that the beam falls at a desired location relative to the saw cut line, to provide a cutting guide as appropriate for the type of saw and the diameter of the saw blade. The preferred approximate dimensions and angles of the construction of the preferred embodiment are shown in FIGS. 5 and 10.

By having the laser beam angled away from the saw blade so that it never intersects the plane of the saw blade or cutting/machining tool, there is enough of a gap between where the saw blade actually cuts and where the laser is shining, relative to the saw blade, so as not to have the laser illumination line completely overlap and thus be completely visually absorbed by the cut indication line drawn on the stock to be cut. The laser illumination line may partially overlap the drawn cut line. If the laser illumination line were placed directly over a dark cut indication line, the laser would not be visible to the operator and the effectiveness of the laser for the operator could be compromised. In wood working the cut indication line on the wood is usually a pencil line, or line or mark darker or lighter than the wood being cut, and of varying thicknesses.

By allowing the laser to have a beam angled away from the blade, the result can be a clear laser illumination line indicator that falls where desired relative to the cut indication line or other marks placed on the stock to be cut.

The angled laser beam benefit is also applicable to all machines and materials not just those used in the woodworking industry, or wood as the material, that may have a cut indication mark on the material being cut.

Opening 31 in extended housing portion 33 accepts a housing adjustment screw during final assembly of the device. A screw is placed through hole 31 and moved until it contacts the bottom of housing 12. Adjustment of the screw adjusts the angle of somewhat flexible housing portion of 33, to change the angle of lens 34 relative to housing 12. This is the means by which the angle of the beam emitted from lens 34 relative to the saw blade is adjusted during final assembly. The sliding engagement of lens 34 along barrel 38 focuses the light beam at the correct distance from the housing. This sliding focus and the angle adjustment allow the beam to be directed away from the plane of the blade such that the beam is not parallel to the plane of the blade, to accomplish the result described above. Also as described above, the distance from bottom 41 of housing 12 to the lower portion of the light beam is preferably from 0.0001-1.0 inches. Once the diode and lens assembly is properly set in the assembly process, the lens and assembly are fixed in place using a heat conductive epoxy that also helps to conduct heat from the laser diode to the housing so that the housing can act as a heat sink.

Figure 7A:
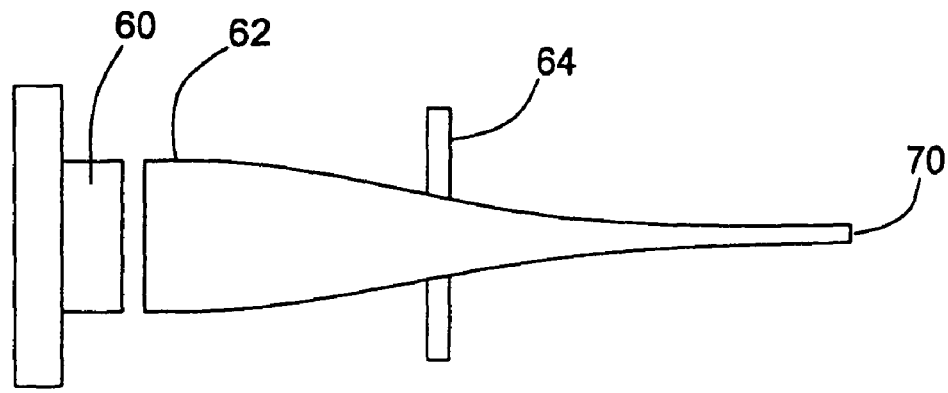
FIGS. 7A and 7B are top and side views, respectively, of an alternative form of delivering the laser light for the device of this invention.
Figure 7B:
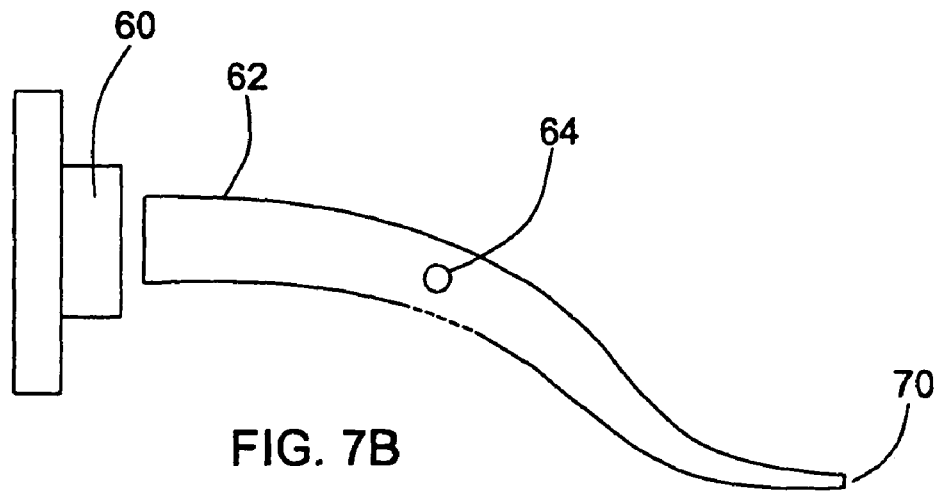
Figure 8:
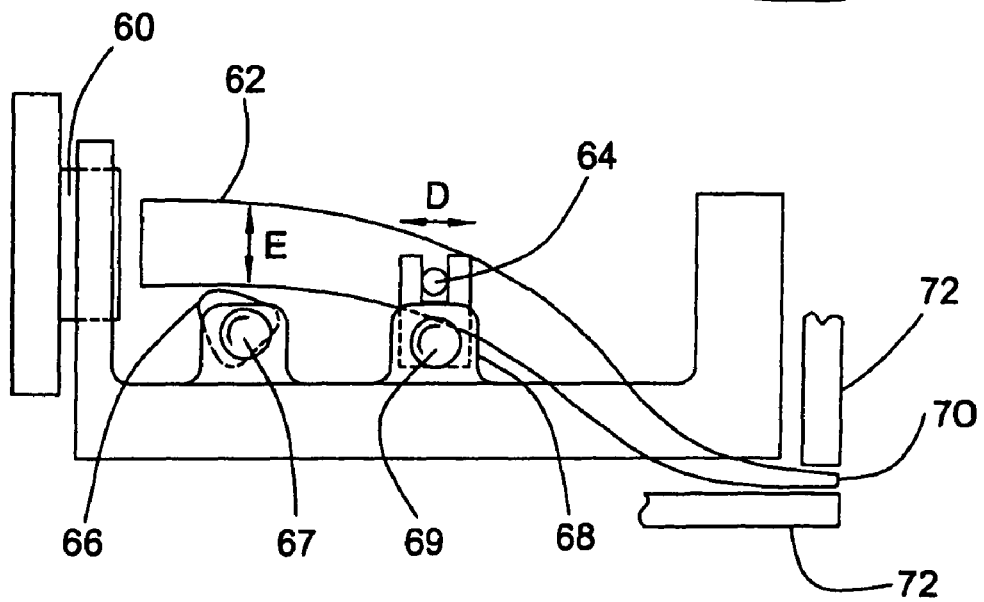
FIG. 8 is a more detailed side view of the light delivery means shown in FIG. 7.

FIGS. 7 and 8 disclose an alternative means of delivering light from laser diode 60 using light pipe 62 with distal end 70 that is held in a proper sized opening (FIG. 8) at the lower side of housing 72. Preferably the light pipe has a consistent diameter along its length, so that it more efficiently delivers light to the source. The focus and angle adjustment is accomplished in this example, by movement of light pipe 62 up and down in the direction of arrow E and back in forth in the direction of arrow D. Cam 66 provides the up and down motion by turning of knob 67 that is fixed to cam 66. The back and forth motion is provided by cam 68 that pushes on rod 64 that projects from light pipe 62. Cam 68 is moved by rotation of knob 69.

Figure 9A:
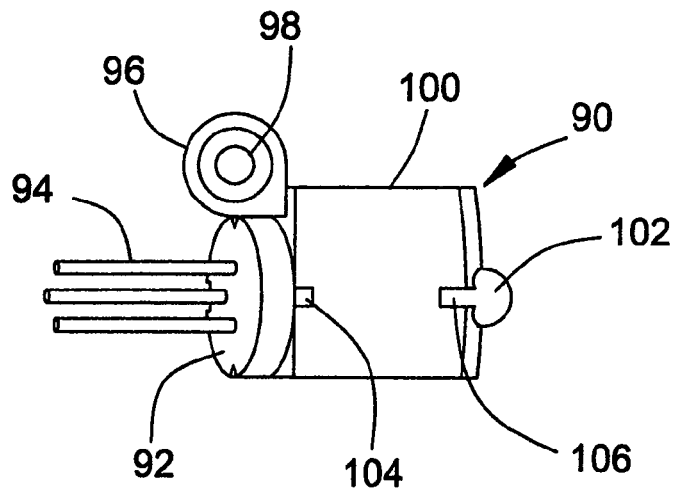
FIGS. 9A-9C are top, perspective and cross-sectional views, respectively, of an alternative embodiment of the laser light delivery means for the invention.
Figure 9B:
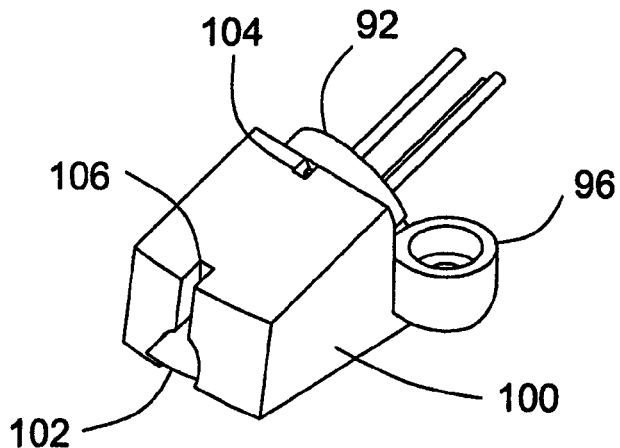
Figure 9C:
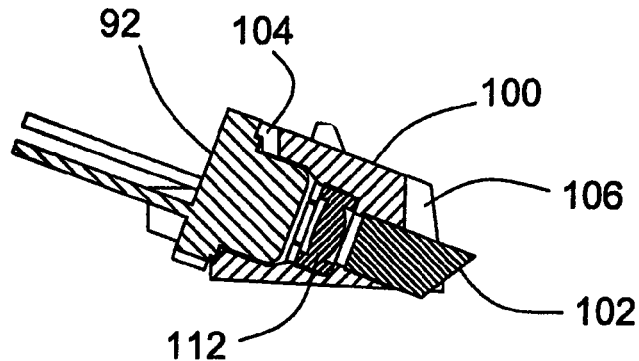

FIGS. 9A-9C show another embodiment of a diode and focusing lens construction, similar to that of the embodiment of FIGS. 1-6. Assembly 90 includes laser diode 92 with leads 94 held in housing 100 in proximity to lens combination 102 and 112. Lens 102 is axially slideable within housing 100 similar to the embodiment shown in FIGS. 5 and 6. Protruding holder 96 with opening 98 provides the screw-enabled height adjustment as described above. Slots 104 and 106 are provided so that laser diode 92 and lens 102 can be fixed in place relative to housing 100 by introducing a glue or adhesive into the slots once the diode and lens are in the proper position to place and focus the beam as desired.

The preferred embodiment of the laser diode placement and focusing means is shown in FIG. 10. Laser diode 172 has leads 174 that are soldered to circuit board 176 that is coupled to housing 164. Lens 170 is held in annular lens holder 168 that is received by threads or other means in housing 164 to allow holder 168 to be moved in direction of arrows G relative to housing 164, to change the distance between diode 172 and lens 170 and thus achieve a proper beam focus. The beam path 180 is at a shallow positive angle relative to saw blade 162 such that it never intercepts the plan of the blade. The angle is set by physically moving diode 172 up or down in the direction of arrow F. When the desired diode location and lens location are achieved, diode 172 is set in place relative to the housing using a heat conductive epoxy that also helps to transfer heat from diode 172 to housing 164 so that the housing can act as a heat sink. Alternative manners of fixing the diode and conducting the heat from the diode can be employed.

Figure 11:
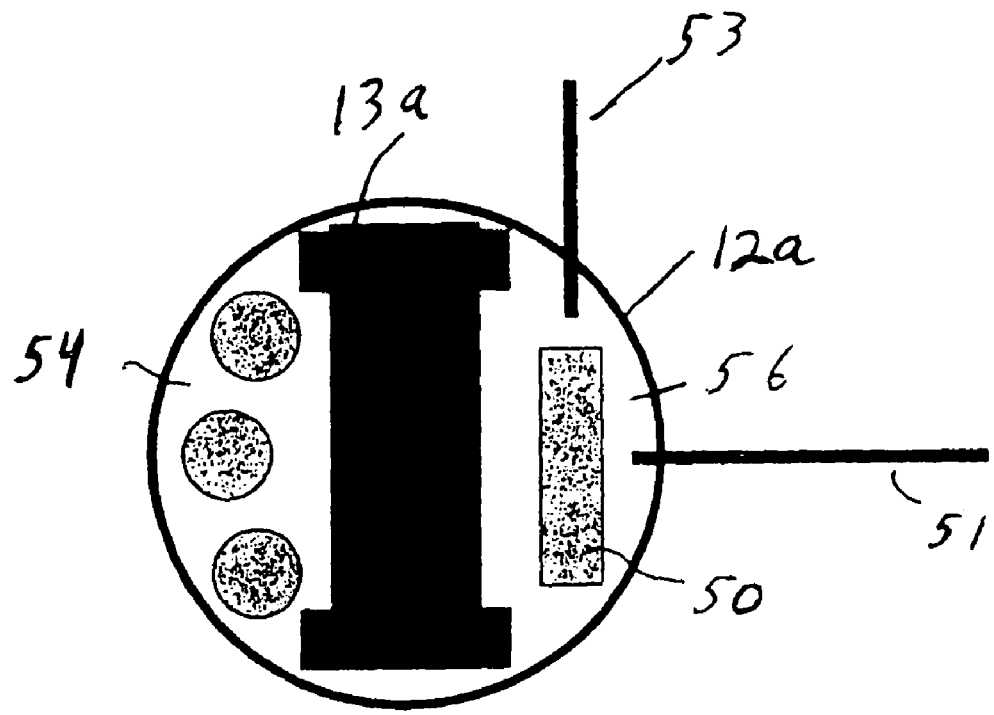
FIG. 11 is a top view of the housing, battery, and electronics for another embodiment of the cut alignment device of this invention.

FIG. 11 shows another embodiment of housing 12a with central strengthening/dividing portion 13a having two aligned radial arms. Note that the arms in each embodiment can extend all the way to the circumference of the housing, or be shorter than that. Portion 13a creates compartments or cavities 54 and 56 that house the batteries and the electronics module 50, respectively, as shown. Alternative laser paths 51 and 53 depict the possible directions from which the laser beam is emitted from the housing.

Figure 12:
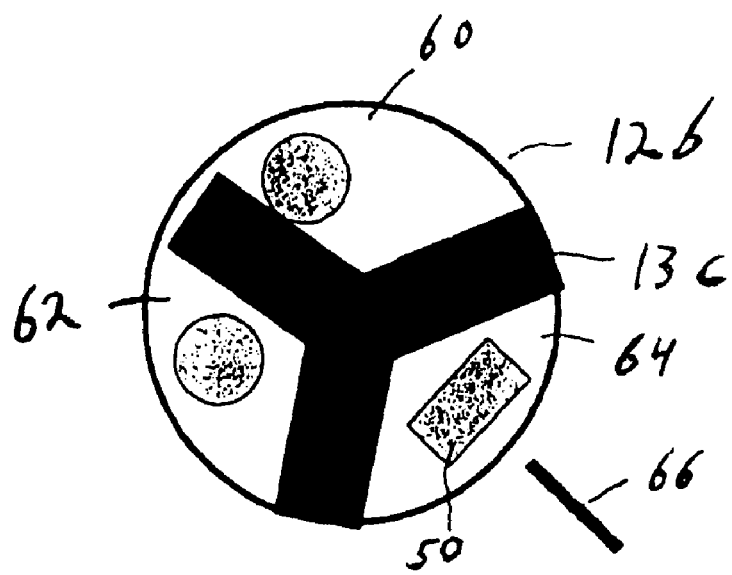
FIG. 12 is a top view of the housing, battery, and electronics for yet another embodiment of the cut alignment device of this invention.

FIG. 12 shows another embodiment of housing 12b with central strengthening/dividing portion 13c having three arms, none of which are aligned. Portion 13c creates compartments 60, 62 and 64, that house the batteries and the electronics module 50, respectively, as shown. Laser path 66 is shown.

The device can have a desired diameter. For saws with blades of up to twelve inches in diameter, the device preferably has a diameter of no more than about 2.5", so that the effective cutting depth of the blade is not impacted. For larger commercial saws having blade diameters of up to 24", the device may have a diameter of up to 6". The diameter of the laser device can be selected so as not to substantially limit the cut depth of a particular saw blade.

Although specific features of the invention are shown in some drawings and not others, this is for convenience only as features may be combined as would be apparent to those skilled in the art, in accordance with the invention.

Other embodiments will occur to those skilled in the art and are within the following claims:

What is claimed is:

1. A cut alignment device for a rotary saw having a motor which spins a cutting unit, the cutting unit including a rotary shaft driven by the motor, and a circular blade having a central aperture through which the rotary shaft fits, the circular blade having a flat surface that is transected by the central aperture and wherein the flat surface lies in a plane of the circular blade, the cut alignment device comprising:
 a structural housing;
 a battery power source located within the structural housing; and
 a light source, operatively connected to the battery power source, and located within the structural housing;
 wherein the structural housing is mounted on the rotary shaft, and wherein the light source projects a light beam from the structural housing directed slightly away from the plane of the circular blade at a positive angle such that the light beam is not parallel to the plane of the circular blade and never intersects the plane of the circular blade, to assist an operator in cutting accurately.

2. The cut alignment device of claim 1, further including a switch located within the structural housing and connected between the battery power source and the light source, for selectively applying power to the light source.

3. The cut alignment device of claim 2, in which the switch is centrifugally engaged, to automatically power the light source when the rotary shaft is spinning.

4. The cut alignment device of claim 1, in which the structural housing accomplishes a blade mounting device, and the blade mounting device defines an aperture from which the light beam emanates.

5. The cut alignment device of claim 4, further including a focusing lens located within the structural housing and aligned with the aperture for focusing the light beam from the light source.

6. The cut alignment device of claim 5, wherein the distance between the light source and the focusing lens is adjustable.

7. The cut alignment device of claim 4, in which the structural housing is held on the rotary shaft against the circular blade.

8. The cut alignment device of claim 4, wherein the light source is adjustable relative to the structural housing, to adjust the angle at which the light beam emanates from the housing.

9. The cut alignment device of claim 1, wherein the structural housing defines at least two internal compartments separated by one or more arms.

10. A cut alignment device for a rotary saw having a motor which spins a cutting unit, the cutting unit including a rotary shaft driven by the motor, and a circular blade having a central aperture through which the rotary shaft fits, the circular blade defining a flat surface that is transected by the central aperture and wherein the surface lies in a plane of the circular blade, the cut alignment device comprising:
 a structural housing defining at least two internal compartments;
 a battery power source mounted within one compartment in the structural housing;

a light source operatively connected to the battery power source and mounted within one compartment in the structural housing, wherein the structural housing defines an aperture from which the light beam emanates; and a centrifugally-engaged switch between the battery power source and the light source and mounted within one compartment in the structural housing, to automatically power the light source when the rotary shaft is spinning;

wherein the structural housing is mounted on the rotary shaft, and wherein the light source projects the light beam from the aperture directed slightly away from the plane of the circular blade at a positive angle such that the light beam is not parallel to the plane of the circular blade and never intersects the plane of the circular blade, to assist an operator in cutting accurately.

* * * * *